July 10, 1923.
H. N. OTT ET AL
1,461,367
CONDENSER OR ILLUMINATOR FOR MICROSCOPES
Filed May 3, 1920
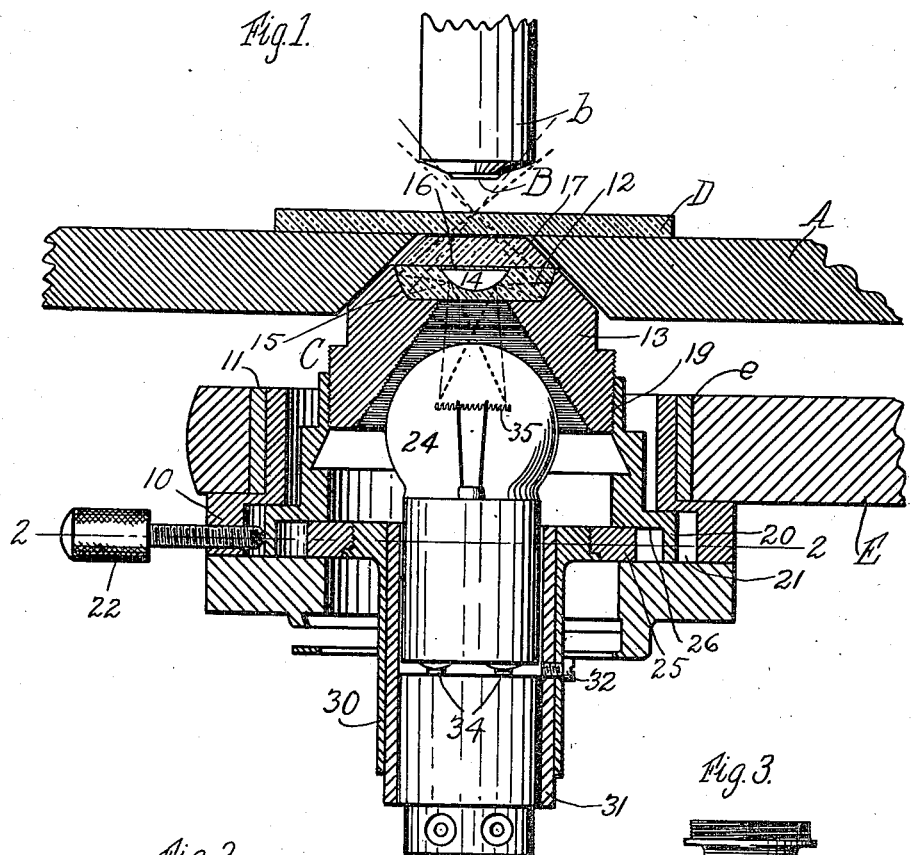
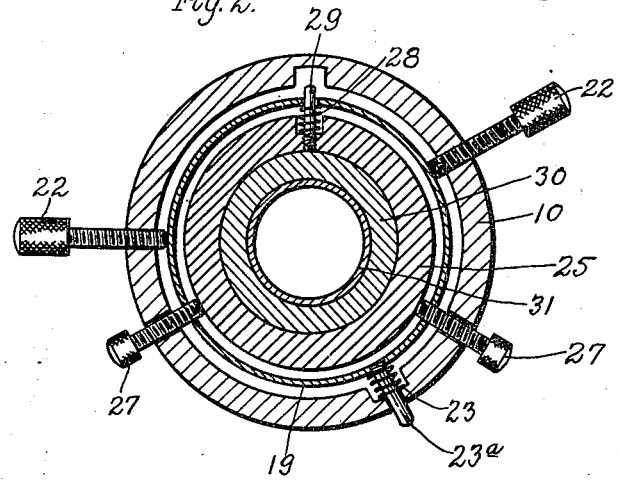
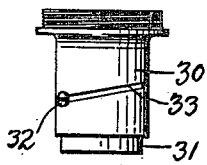
Inventors
Harry N. Ott & Harry G. Ott
By Parker & Brochnow,
Attorneys Patented July 10, 1923.

1,461,367

UNITED STATES PATENT OFFICE.

HARVEY N. OTT AND HARRY G. OTT, OF BUFFALO, NEW YORK, ASSIGNORS TO SPENCER LENS COMPANY, OF BUFFALO, NEW YORK.

CONDENSER OR ILLUMINATOR FOR MICROSCOPES.

Application filed May 3, 1920. Serial No. 378,371.

*To all whom it may concern:*

Be it known that we, HARVEY N. OTT and HARRY G. OTT, citizens of the United States, residing at Buffalo, in the county of Erie and State of New York, have invented a new and useful Improvement in Condensers or Illuminators for Microscopes, of which the following is a specification.

This invention relates more particularly to that kind of specimen illuminating devices for microscopes, known as dark field condensers or illuminators, which are constructed so that the rays of light which illuminate the specimen are directed thereon at an obliquity such that they do not enter the objective lens of the microscope, and therefore produce a dark field.

In the use of these illuminators it is important that the reflector or other means for directing light rays to the condenser lens be accurately adjusted relatively to said lens and the optical axis of the microscope so that the light rays will converge to a point substantially on the specimen and coincident with the optical axis, and will extend in directions so as to escape the objective lens. In order to insure the best results it is also desirable that the specimen shall be equally illuminated from all sides or at least from opposite directions. In the case of instruments in which the specimen is illuminated by light rays reflected to the condenser lens from an arc lamp or other distance source of light, considerable difficulty is experienced in obtaining the above stated conditions and much time is consumed in properly adjusting the reflector relatively to the lamp and the condenser lens. It is also difficult to maintain the adjustment because, ordinarily, the microscope and the source of light are disconnected, or mounted on separate supports, and the microscope itself, or the reflector, is apt to be accidentally shifted relatively to the source of light and thus disturb the intended adjustment.

One object of this invention is to provide a desirable and efficient dark field condenser or illuminator of compact and practical construction, in which the lamp or source of light and the lens, or device for directing the light rays to the specimen, are mounted or connected in a unitary structure, which can be placed in position on the microscope and adjusted or used with the same facility as the ordinary condenser.

Other objects of the invention are to produce a convenient specimen illuminating device of compact arrangement in which the condenser lens and the lamp or source of light can be readily adjusted with relation to each other and to the optical axis; also to use an electric lamp having an incandescent filament arranged so as to produce as nearly as possible a uniform illumination of the specimen from all sides, and to arrange the lamp so that it can be adjusted both longitudinally and laterally to insure the proper positioning of the filament relatively to the condenser lens; also to so design a dark field condenser lens that it can be located in proximity to the lamp and will nevertheless properly direct the divergent light rays of the lamp to the specimen; and also to improve condensers or illuminators for microscopes in the other respects hereinafter described and set forth in the claims.

In the accompanying drawings:

Fig. 1 is a fragmentary sectional elevation, much larger than actual size, of a microscope provided with a dark field condenser or illuminator embodying the invention.

Fig. 2 is a reduced sectional plan view thereof on line 2—2 Fig. 1.

Fig. 3 is an elevation of the lamp support removed from the condenser casing.

Fig. 4 is a plan view of the lamp bulb.

A represents the stage, B the objective lens, *b* the holder or nose piece therefor, and C the condenser of a microscope. D is the specimen slide or piece of glass carrying the specimen to be observed. The specimen slide, as usual, is supported on the stage over an opening therein, and the condenser is carried by a substage arm or support E by which it is adapted to be supported with the condenser lens in the opening in the stage, close to the underside of the specimen slide.

In the construction shown in the drawings, the condenser comprises an annular casing 10 in which is located the lamp or source of light, the lens for directing the light rays to the specimen, and the lamp and lens adjusting means, and the condenser is preferably, as usual, adapted to be removably secured in an opening *e* in the substage arm E. 11 represents a ring surrounding the condenser casing and adapted to fit and retain the condenser frictionally in the opening in the substage arm E. 12 represents the condenser lens, and 13 the lens carrier or mounting. The lens 12 has a segmental, spherical cavity with a silvered or reflecting surface 14, and an exterior segmental, spherical reflecting surface 15, these internal and external surfaces being concentric with each other and adapted to be concentric with the optical axis of the microscope when the lens is in proper position. The lens is designed and its reflecting surfaces related so that the divergent light rays from a lamp located within the casing 10 relatively close to the lens will be properly concentrated on the specimen. 16 represents a small opaque disk which is preferably secured in the lens over the spherical cavity therein to prevent the passage of light rays vertically through the lens. The lens also has the usual flat, parallel-faced, cover glass 17. The lens carrier 13 is preferably provided with an externally screw-threaded lower end, by which it is screwed into a threaded opening in the upper end of an annular supporting shell 19 which is adjustable laterally in the casing 10 for placing the lens 12 concentric with the optical axis of the microscope. The lens supporting shell 19 is preferably provided at its lower end with an outwardly projecting peripheral flange 20 which is confined and adapted to slide laterally in an annular, internal groove 21 in the condenser casing. The shell is adjusted and held in adjusted position preferably by means of two thumb screws 22 and a spring 23 which are disposed 120° apart around the circumference of the casing. The thumb screws turn in screw-threaded holes in the wall of the casing 10 and bear at their inner ends against the supporting shell 19 for the lens, and the spring 23 preferably surrounds a guide pin 23ᵃ which is attached to the supporting shell and projects radially therefrom through a guide hole in the wall of the casing. By the proper manipulation of the thumb screws 22 the condenser lens 12 can be adjusted to a position accurately concentric with the axis of the objective B.

24 represents the lamp, preferably a small incandescent electric lamp located within the casing 10 below and in proximity to the lens 12. Preferably the lamp is supported by a ring 25 which is adjustable laterally relative to the lens supporting shell 19. The ring 25, as shown, is confined and adapted to slide laterally within an annular cavity formed between a downwardly facing internal shoulder 26 on the shell 19 and the bottom face of the groove 21 in the lower portion of the condenser casing. This ring is adapted to be adjusted laterally, in a manner similar to the supporting shell 19, by means of two adjusting screws 27 and a spring 28. As shown, these screws pass loosely through holes in the casing 10, turn in threaded holes in the wall of the shell 19, and bear at their inner ends against the lamp supporting ring 25, and the spring surrounds a radial guide pin 29 secured to the ring and passing through a guide hole in the shell 19. 30 represents a lamp-carrying tube provided at its upper end with a screw-threaded flange which is screwed into an internal thread in the supporting ring 25 so that the tube can be readily screwed into and removed from the ring. Within this tube 30 is a longitudinally adjustable lamp socket 31 in which the incandescent lamp bulb 24 is mounted, preferably removably in a well known manner, by means of lateral studs on the neck of the bulb engaging in bayonet slots in the walls of the socket. The socket 31 is adapted to be adjusted lengthwise in the lamp carrying tube 30, for which purpose the socket is provided at one side with a screw or stud 32 which projects therefrom through an oblique slot 33 in the carrying tube, see Fig. 3. By turning the socket in the tube the stud 32 will slide in the inclined slot and thus adjust the lamp lengthwise in the lamp support to place the lamp filament at the proper distance from the condenser lens. The lamp can be readily secured in place in and removed from the condenser casing by means of the removable screw-threaded carrying tube 30 and when this is removed from the casing the lamp bulb can be placed in and removed from the lamp socket in the usual way. The lamp socket is, as usual, provided with suitable contact terminals 34 or other means of suitable or usual construction for connecting the electric conductors with the lamp. The lamp bulb is preferably provided with a substantially annular incandescent filament 35 arranged horizontally concentric with the axis of the bulb.

The lamp can be readily adjusted laterally within the supporting shell 19 for the condenser lens 12 to place the lamp filament concentric with the axis of the lens by the proper manipulation of the adjusting screws 27 and the lamp and lens can then be adjusted laterally to place both the lens and lamp filament concentric with the optical axis of the microscope by the proper manipulation of the screws 22. Thus the lamp is adjustable independently both laterally and longitudinally relatively to the condenser lens, and the lens and lamp are adjustable together or as a unit relatively to the optical axis. The adjustments can be readily and quickly made and when once made, will be maintained, thereby insuring the proper direction of the rays for illuminating the specimen. While the lens 12 and lamp are preferably mounted and adjusted as described, other arrangements adapted to permit similar adjustments of the lens and lamp could be employed.

Since the condenser casing 10 forms a common support or carrier for both the lens 12 and the lamp 24 and is removable from the substage arm 11, the casing, together with the lamp and lens can be placed in and removed from the microscope or otherwise handled or manipulated as a unit, in the same manner as the ordinary condenser, and after the lens and lamp have been once adjusted relatively to each other and to the optical axis, the condenser unit can be removed from and replaced in the instrument without disturbing the adjustments. The described construction enables the lamp and lens to be mounted in a condenser casing of ordinary dimensions.

The paths of the light rays from the lamp for illuminating the specimen are indicated by the broken lines in Fig. 1, from which it will be seen that the rays, which converge to the specimen, pass outside of the objective lens B.

We claim as our invention:

1. In a specimen illuminator for microscopes, the combination of a source of light, a device for directing the light rays from said light to the specimen, a support in which said ray-directing device and the source of light are mounted, means for adjusting said support with said ray-directing device and source of light carried thereby relatively to the optical axis of the microscope, and means for independently adjusting said source of light relatively to the ray-directing device.

2. In a specimen illuminator for microscopes, the combination of a casing, a lamp mounted in said casing, a device mounted in said casing for directing the light rays from the lamp to the specimen, means for adjusting said ray-directing device laterally relatively to the optical axis of the microscope for centering said ray-directing device in the optical axis, and means for adjusting said lamp relatively to said ray-directing device.

3. In a specimen illuminator for microscopes, the combination of a casing, a lamp located in said casing, a device mounted in said casing for directing the light rays from the lamp to the specimen, means for adjusting said ray-directing device relatively to the optical axis of the microscope, and said lamp being adjustable longitudinally and laterally relatively to said ray-directing device.

4. In a specimen illuminator for microscopes, the combination of a casing, a lamp supported by said casing and removable from the lower end thereof, a device mounted in said casing above the lamp for directing light rays from the lamp to the specimen, and means for simultaneously and correspondingly adjusting the lamp and ray-directing device laterally relatively to the optical axis of the microscope.

5. In a specimen illuminator for microscopes, the combination of a condenser lens constructed to produce a dark field illumination of the specimen, a support for said lens, constituting a separable microscope attachment and a source of light mounted on said support and located below said lens in proximity thereto so that the rays from said light diverge to said lens, said lens being designed to condense on the specimen the divergent light rays from said source of light.

6. In a specimen illuminator for microscopes, the combination of a condenser lens constructed to produce a dark field illumination of the specimen, a casing separable from the microscope and supporting said lens, and a source of light supported by said casing and located below said lens so that the rays from said light diverge to said lens, said lens being designed to condense on the specimen the divergent light rays from said source of light.

7. In a microscope, the combination with the stage, of an annular condenser casing mounted beneath the stage, a source of light mounted within said casing, a light condenser mounted in said casing above said source of light, means for effecting a relative adjustment of said source of light and condenser, and means for adjusting both the source of light and condenser as a unit relatively to the optical axis of the microscope.

8. In a microscope, the combination with the stage and substage, of an annular condenser casing removably mounted on the substage, a source of light mounted within said casing, a light condenser mounted in said casing above said source of light, means for effecting a relative adjustment of said source of light and condenser, and means for adjusting both the source of light and condenser as a unit relatively to the optical axis of the microscope, said casing together with the source of light, condenser and said adjusting means being removable as a unit from the substage.

9. In a specimen illuminator for microscopes, the combination of a source of light, a condenser for directing the light rays to the specimen, an adjustable support on which said condenser is mounted, and means for adjusting said support for centering the condenser relatively to the optical axis of the microscope, said source of light being also mounted on said adjustable support, whereby the relation of said condenser and source of light remains fixed notwithstanding adjustments of said condenser support.

10. A separable specimen illuminating attachment for microscopes, comprising a condenser for directing light rays from a lamp to the specimen, a casing which carries said condenser and is constructed to be removably positioned and retained on the substage of the microscope, and a lamp located below said condenser for illuminating the specimen, said lamp being supported by said condenser casing and detachable therewith from the microscope, and said lamp being also separable from said condenser casing.

Witness our hands this 29 day of April, 1920.

HARVEY N. OTT.
HARRY G. OTT.

Witnesses:
M. J. PITMAN,
C. W. PARKER.